US012386890B1

United States Patent
Mittal et al.

(10) Patent No.: US 12,386,890 B1
(45) Date of Patent: Aug. 12, 2025

(54) PLAUSIBLE ACTION ANTICIPATION USING LARGE VIDEO-LANGUAGE MODELS

(71) Applicant: Honda Motor Co., Ltd., Tokyo (JP)

(72) Inventors: Himangi Mittal, Pittsburgh, PA (US); Nakul Agarwal, San Francisco, CA (US); Shao-Yuan Lo, Milpitas, CA (US); Kwonjoon Lee, San Jose, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/629,275

(22) Filed: Apr. 8, 2024

Related U.S. Application Data

(60) Provisional application No. 63/561,477, filed on Mar. 5, 2024.

(51) Int. Cl.
  *G06F 16/00* (2019.01)
  *G06F 16/732* (2019.01)
  *G06F 16/783* (2019.01)

(52) U.S. Cl.
  CPC ........ *G06F 16/7328* (2019.01); *G06F 16/783* (2019.01)

(58) Field of Classification Search
  CPC .......................... G06F 16/7328; G06F 16/783
  See application file for complete search history.

(56) References Cited

U.S. PATENT DOCUMENTS

| | | | | |
|---|---|---|---|---|
| 2021/0174093 | A1* | 6/2021 | Li | G06N 3/045 |
| 2021/0253128 | A1* | 8/2021 | Nister | G05D 1/646 |
| 2024/0288870 | A1* | 8/2024 | Hori | G06V 40/20 |
| 2024/0404283 | A1* | 12/2024 | Wang | G06V 10/776 |

FOREIGN PATENT DOCUMENTS

WO WO-2024071836 A1 * 4/2024 ............. G06N 3/092

OTHER PUBLICATIONS

Mittal et al. Can't make an Omelette without Breaking some Eggs: Plausible Action Anticipation using Large Video-Language Models. <https://arxiv.org/abs/2405.20305> (Year: 2024).*
Ashutosh et al., HierVL: Learning Hierarchical Video-Language Embeddings. <https://arxiv.org/abs/2301.02311> (Year: 2023).*

\* cited by examiner

*Primary Examiner* — Syed H Hasan
(74) *Attorney, Agent, or Firm* — Plumsea Law Group, LLC

(57) ABSTRACT

Systems and methods for augmenting large video language models (LVLMs) by incorporation of a plausible action anticipation framework. The framework augments the LVLM by taking into account the aspect of plausibility in an action sequence. Two objective functions directed to counterfactual-based plausible action sequence learning loss and a long-horizon action repetition loss are derived and used to train the LVLM to generate plausible anticipated action sequences. The augmented LVLM is then able to produce sequences whereby each action in the sequence is temporally and spatially factual with respect to the others.

20 Claims, 8 Drawing Sheets or# PLAUSIBLE ACTION ANTICIPATION USING LARGE VIDEO-LANGUAGE MODELS

RELATED DISCLOSURES

This patent disclosure is related to U.S. Provisional Application No. 63/561,477 filed Mar. 5, 2024, entitled "Plausible Action Anticipation using Large Video-Language Models", in the names of the same inventors which is incorporated herein by reference in its entirety. The present patent application claims the benefit under 35 U.S.C § 119 (e) of the aforementioned provisional application.

BACKGROUND

The present disclosure generally relates to using large video-language models to anticipate action sequences that are plausible in the real-world. More particularly, the disclosed subject matter relates to methods and systems that improve the generative capability of a large video-language models by incorporating a counterfactual-based plausible action sequence learning loss function and a long-horizon action repetition loss function.

The ability to anticipate what is going to happen in the near future is fundamental for human beings in order to interact with the environment and make decisions. Anticipation abilities are also fundamental to deploy intelligent systems which need to interact with a complex environment or other humans to automate challenging tasks and provide assistance. Examples of such applications include autonomous vehicles, human-robotic symbiotic systems, and wearable assistants. However, designing computational approaches to address tasks such as early action recognition and action anticipation is challenging as it often requires to model the relationship between past and future events, in the presence of incomplete observations. To enable this, the model should be able to reason effectively from the spatial as well as temporal information of the visual scene.

There is a need in the art for a generative artificial intelligence (AI) system that effectively addresses the challenges of action anticipation.

SUMMARY

The disclosed embodiments provide methods and systems for improving action anticipation tasks in large video models, large language models, and/or large video language models.

In one aspect, a method of augmenting a large video language model (LVLM) for anticipating plausible action sequences is provided. The method may include creating a temporal logical constraint for each video-text action sequence pair in a first video dataset by reference to a ground truth text sequence for the first video dataset to produce a first constraint set. The method can also include creating a verb-noun action pair logical constraint for each video-text action sequence pair in the first video dataset by reference to the ground truth text sequence for the first video dataset to produce a second constraint set. The method may further include deriving a first objective function representing counterfactual-based plausible action sequence learning loss based on the first constraint set and the second constraint set. In addition, the method can include training the LVLM to optimize for the first objective function, thereby aligning a visual modality of the LVLM closer to a temporally correct, plausible action sequence, and receiving, at the trained LVLM, a second video dataset that depicts one or more actions. Furthermore, the method can include generating, via the trained LVLM, a sequence of anticipated actions that could plausibly occur following the actions depicted in the second video dataset, each action in the sequence being temporally and spatially factual with respect to one another. In one embodiment, the LVLM incorporates a long-horizon action repetition loss ("repetition loss") where subsequent actions that are more prone to repetition are assigned a higher penalty and the earlier, immediate actions are assigned a lower penalty.

Another aspect provides a non-transitory computer-readable medium storing software for augmenting a large video language model (LVLM) for anticipating plausible action sequences, the software comprising instructions executable by one or more computers which, upon such execution, cause the one or more computers to: (1) create a temporal logical constraint for each video-text action sequence pair in a first video dataset by reference to a ground truth text sequence for the first video dataset to produce a first constraint set; (2) create a verb-noun action pair logical constraint for each video-text action sequence pair in the first video dataset by reference to the ground truth text sequence for the first video dataset to produce a second constraint set; (3) derive a first objective function representing counterfactual-based plausible action sequence learning loss based on the first constraint set and the second constraint set; (4) train the LVLM to optimize for the first objective function, thereby aligning a visual modality of the LVLM closer to a temporally correct, plausible action sequence; (5) receive, at the trained LVLM, a second video dataset that depicts one or more actions; and (6) generate, via the trained LVLM, a sequence of anticipated actions that could plausibly occur following the actions depicted in the second video dataset, each action in the sequence being temporally and spatially factual with respect to one another. In one embodiment, the LVLM incorporates a long-horizon action repetition loss ("repetition loss") where subsequent actions that are more prone to repetition are assigned a higher penalty and the earlier, immediate actions are assigned a lower penalty.

In another aspect, the disclosure provides a system for augmenting a large video language model (LVLM) for anticipating plausible action sequences. The system includes one or more computers and one or more storage devices storing instructions that are operable, when executed by the one or more computers, to cause the one or more computers to: (1) create a temporal logical constraint for each video-text action sequence pair in a first video dataset by reference to a ground truth text sequence for the first video dataset to produce a first constraint set; (2) create a verb-noun action pair logical constraint for each video-text action sequence pair in the first video dataset by reference to the ground truth text sequence for the first video dataset to produce a second constraint set; (3) derive a first objective function representing counterfactual-based plausible action sequence learning loss based on the first constraint set and the second constraint set; (4) train the LVLM to optimize for the first objective function, thereby aligning a visual modality of the LVLM closer to a temporally correct, plausible action sequence; (5) receive, at the trained LVLM, a second video dataset that depicts one or more actions; and (6) generate, via the trained LVLM, a sequence of anticipated actions that could plausibly occur following the actions depicted in the second video dataset, each action in the sequence being temporally and spatially factual with respect to one another. In one embodiment, the LVLM incorporates a long-horizon action repetition loss ("repetition loss") where subsequent actions that are more prone to repetition are assigned a higher penalty and the earlier, immediate actions are assigned a lower penalty.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments may be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
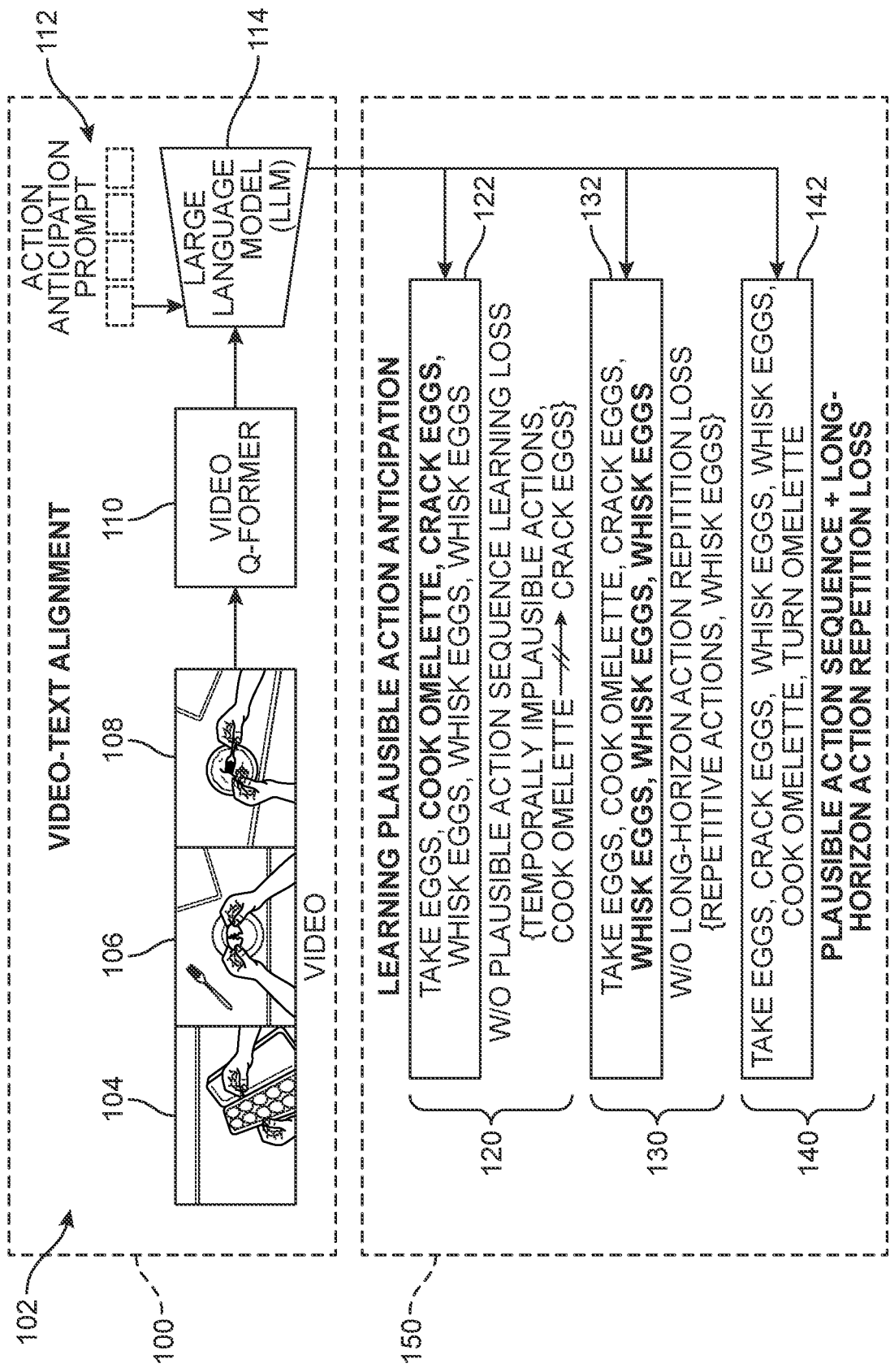
FIG. 1 depicts a schematic diagram of a process by which a large video language model (LVLM) trained in the task of plausible action anticipation can generate accurate action sequences, according to an embodiment.

Large Language Modeling are used to model generative likelihoods over word token sequences and predict the probabilities of the next/future tokens. Large language models (LLMs) are transformers with billions of parameters that have been trained on massive amounts of data and are capable of question-answering tasks and chat-conversations with humans. Techniques such as in-context learning, prompt tuning, chain-of-thought reasoning, and reinforcement learning with human feedback have improved the language models to perform with great success on few-shot tasks. However, while these models have been shown to perform well in understanding inputs and solving complex tasks via text generation, they remain limited. For example, the models are only capable of understanding inputs via a text modality and are at a loss when provided with rich information that is present in other alternate modalities such as video and audio.

The proposed embodiments include provisions to receive videos as input and successfully learn from the sophisticated visual and temporal information present in them. More specifically, the proposed systems and methods enable the development of a large video-language model that can leverage the spatial-temporal information present in videos for anticipating plausible future action sequences. It can be appreciated that the ability to predict future events is a critical component in the decision-making process of an artificial intelligence (AI) agent such as a large video-language model. For example, in the context of an autonomous driving car, being able to anticipate the next sequence of actions with respect to nearby cars, pedestrians, and other agents in the scene can ensure the safety of the vehicle's occupants, pedestrians, as well as the other vehicles. To this end, the proposed embodiments provide a model that is able to reason effectively from the spatial as well as temporal information of a given visual scene, and in particular, enable the model to successfully perform action anticipation. For purposes of this application, "action anticipation" refers to the predictive task of forecasting future actions or activities given a sequence of visual data (e.g., videos, images, etc.).

However, action anticipation has been challenging at least in part due to the uncertainty in precisely predicting the future—in other words, the task is non-deterministic in nature. This stems from the nature of time where, given what has happened so far, there are near-infinite possibilities for what future actions might happen next. Moreover, action anticipation is accompanied by an additional challenge: developing an understanding the implicit temporal information present in an action sequence, which lends the sequence credibility and makes the sequence plausible in the real-world. One of the failings of conventional models is their inability to model and understand the visual-temporal information that is present in videos, and so these models have remained ineffective in the task of action anticipation as they cannot discern the temporal correlations among the actions in a sequence. For example, some have attempted to use long short-term memory (LSTM) networks or other recurrent neural networks (RNNs), yet are unable to effectively capture the temporal relations among the actions over a long horizon due to their sequential nature. Those models relying on different types of attention mechanisms, skip-connections, and message-passing frameworks show very little progress. Meanwhile, transformer-based approaches, memory-based systems, or the leveraging of multiple-modalities are confined to the information present in the training data and cannot model the diverse nature of the future actions. Such approaches rely on the ability of the transformer encoder to learn from the given training data which limits their generalization and scaling capability.

To overcome these challenges, the proposed embodiments incorporate aspects of the autoregressive text generation capabilities of generative large video-language models (LVLMs) to improve generalizability for various vision tasks. For purposes of this application, "LVLM" refers to both large language models, large video models, and combination large video and large language models. In some embodiments, the proposed systems provide an improved, augmented LVLM paradigm that is equipped to efficiently model and leverage the temporal cues present in a video to generate plausible action sequences for the task of action anticipation. In one embodiment, the augmented LVLMs can use a Q-former-based transformer architecture to embed videos into spatio-temporal visual representations. This architecture thereby ensures an effective alignment between the visual features and the desired text in the LLM embedding space.

In addition to this alignment, in some embodiments, the augmented LVLM addresses the challenges that are described herein with respect to action anticipation by a training of the model to: (1) understand the temporal correlations present among the actions in a sequence which in turn makes the action sequence temporally plausible in the real-world; and (2) determine the diverse and possible actions that can happen in the future (e.g., a model should follow a temporal constraint that an action X has to happen before for the action Y to happen to make the sequence action X→action Y plausible in the real-world).

To build such a framework for temporal understanding that would be required for generating plausible action sequences, a counterfactual-based plausible action sequence learning loss ("CF loss") is introduced. The CF loss is used to create temporal logic constraints and then train the model to be able to differentiate between "plausible" and "not plausible" action sequences. In addition, in different embodiments, verb-noun action logical constraints can be applied to further improve the model's understanding as to which verbs are appropriately paired or otherwise associated with which nouns to verify plausible actions in the real-world (for example, "cook spoon" would not refer to a plausible action). Thus, the aspect of plausibility in generating an action sequence can be leveraged for the task of action anticipation.

Large language and large video models are also prone to issues involving repetition. While the CF loss is helpful for efficient temporal understanding, in other embodiments, the model can also be adapted with the ability to understand the diverse nature of actions and generate plausible action sequences that are less repetitive. In one embodiment, the augmented LVLM incorporates a long-horizon action repetition loss ("repetition loss") where subsequent actions that are more prone to repetition are assigned a higher penalty and the earlier, immediate actions are assigned a lower penalty.

As will be described in greater detail below, embodiments of the augmented LVLM, also referred to herein as a plausibility LVLM, or "PlausiVL", can harvest the spatial-temporal information present in videos in order to anticipate and forecast plausible future action sequences. To determine and identify these temporal cues and understand the temporal dependencies among actions in a plausible sequence, the plausibility LVLM can (a) calculate a value for counterfactual-based plausible action sequence learning loss, (b) implement temporal logic rules and verb-noun action pair logic constraints for the model to discern plausibility in action sequences, and (c) calculate a value for long-horizon action repetition loss by penalizing more heavily the longer-horizon actions to generate less diverse future actions with less repetition.

As one non-limiting example, FIG. 1 illustrates a schematic diagram of a plausible action anticipation learning process and output of a large video-language model. As a general matter, in a kitchen-based environment, if a human has performed the following series of actions, "open fridge→take eggs→close fridge", an LVLM should be able to reason that "crack eggs" could be one of the plausible future actions. Furthermore, the model should be able to understand that an action such as "crack eggs" will always happen before the action "cook omelet".

As shown in FIG. 1, a first video 100 is represented by a sequence of images (first image 102, second image 104, third image 106, etc.). The first video 100 includes a kitchen-based environment, or more specifically, depicts a view of a person's hands as they go through the steps of preparing an omelet. In one example, the first video 100 can be passed through a video Querying Transformer (Q-Former) 110, or other Querying Attention-based neural network model configured to effectively query the image and extract relevant information to generate accurate and coherent text descriptions. The processed video can then be inputted into a first large video-language model ("first LVLM") 114 which has been provided with an action anticipation prompt 112. The first LVLM 114 can be understood to have been trained to determine two objective functions: (a) plausible action sequence learning loss and (b) long-horizon action repetition loss. As shown in an output array box 150, in a first test case 120 of the LVLM's operation—in which the plausible action sequence learning loss was excluded—a first output 122 has relatively reduced temporal understanding and generates a temporally implausible action sequence (e.g., (1) cook omelet↛(2) crack eggs). Similarly, without the long-horizon action repetition loss, as represented by a second test case 130, the model generates a second output 132 that includes relatively less diverse actions, and repeats of the same action (e.g., (1) whisk eggs→(2) whisk eggs→(3) whisk eggs). However, when the model is trained with both of the objective functions combined, as provided in a third test case 130, the first LVLM 114 is able to generate highly plausible action sequences which are temporally accurate (e.g., (1) crack eggs→(2) cook omelet (e.g., more diverse actions), and (3) whisk eggs→(4) whisk eggs→(5) cook omelet (e.g., fewer repetitions).

Figure 2:
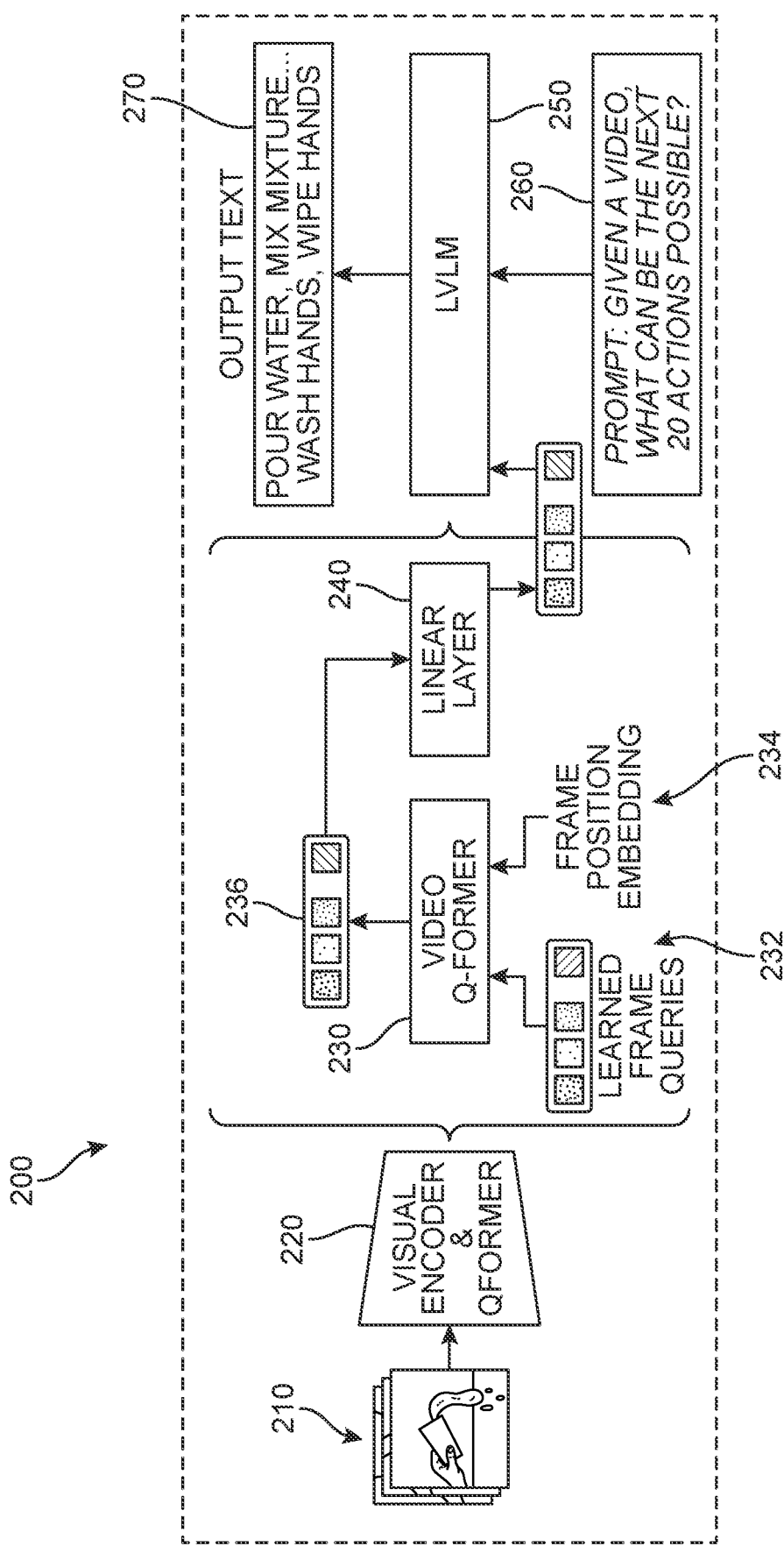
FIG. 2 depicts a schematic diagram of an augmented LVLM system in which a plausible action anticipation framework is implemented, according to an embodiment.

Moving now to FIG. 2, an overview of an augmented LVLM system 200 equipped to learn temporal cues for plausible action sequence generation by incorporation of a plausible action anticipation framework is depicted. As shown in FIG. 2, a video clip 210 can be passed through an encoder module 220, and initially processes the data at a visual encoder where k is the number of query tokens used to extract frame level representations, or "learned frame queries" 232. In some embodiments, the frame level representations 232 are also concatenated with a frame position embedding layer 234 to add temporal understanding. A Q-Former 230 then learns to extract the most useful visual features from the output of the frozen image encoder. A linear layer 240 can be added to an initial output 236 of the Q-Former to project these features into the LVLM space as modified output 242. The modified output 242 can include visual embeddings (visual prompts) that can be next concatenated with text-prompts 260 (e.g., Prompt: Given a video, what can be the next 20 actions possible? ") and submitted to an LVLM to generate a plausible output 270.

In other words, in different embodiments, given a video clip "V" of N frames, with $V=[V_1, V_2, V_3, \ldots V_N]$, the system can implement a frozen visual encoder (VIT) to extract video-frame-level representations, $V=[V^i_1, V^i_2, V^i_3 \ldots V^i_N]$. In different embodiments, each frame feature can then be passed through a Q-Former with k number of query tokens, to obtain the $d_q$-dimensional visual representation as vie $R^{k \times d_q}$. Such queries are helpful in extracting the visual features with the greatest information that are deemed to be aligned to the given text. In addition, in order for the frames to provide an understanding of the temporal relations among them, a frame position embedding layer can be applied to each Q-Former feature. At or around the same time, in some embodiments, a clip-position embedding layer is used to infuse more grouping information about the frames that comprise a video clip. These features are then passed through a video Q-former to aggregate the spatio-temporal information of the video. Finally, a linear projection layer is used to project these output representations to the LVLM text embedding space of di dimension, $v_i \in R^{k_1 \times d_1}$. At this stage, these video embeddings can be identified as "visual prompts". In different embodiments, the visual prompts can be concatenated with the input text embeddings $t_i$ to condition the LVLM to generate text with respect to the video content.

Figure 3:
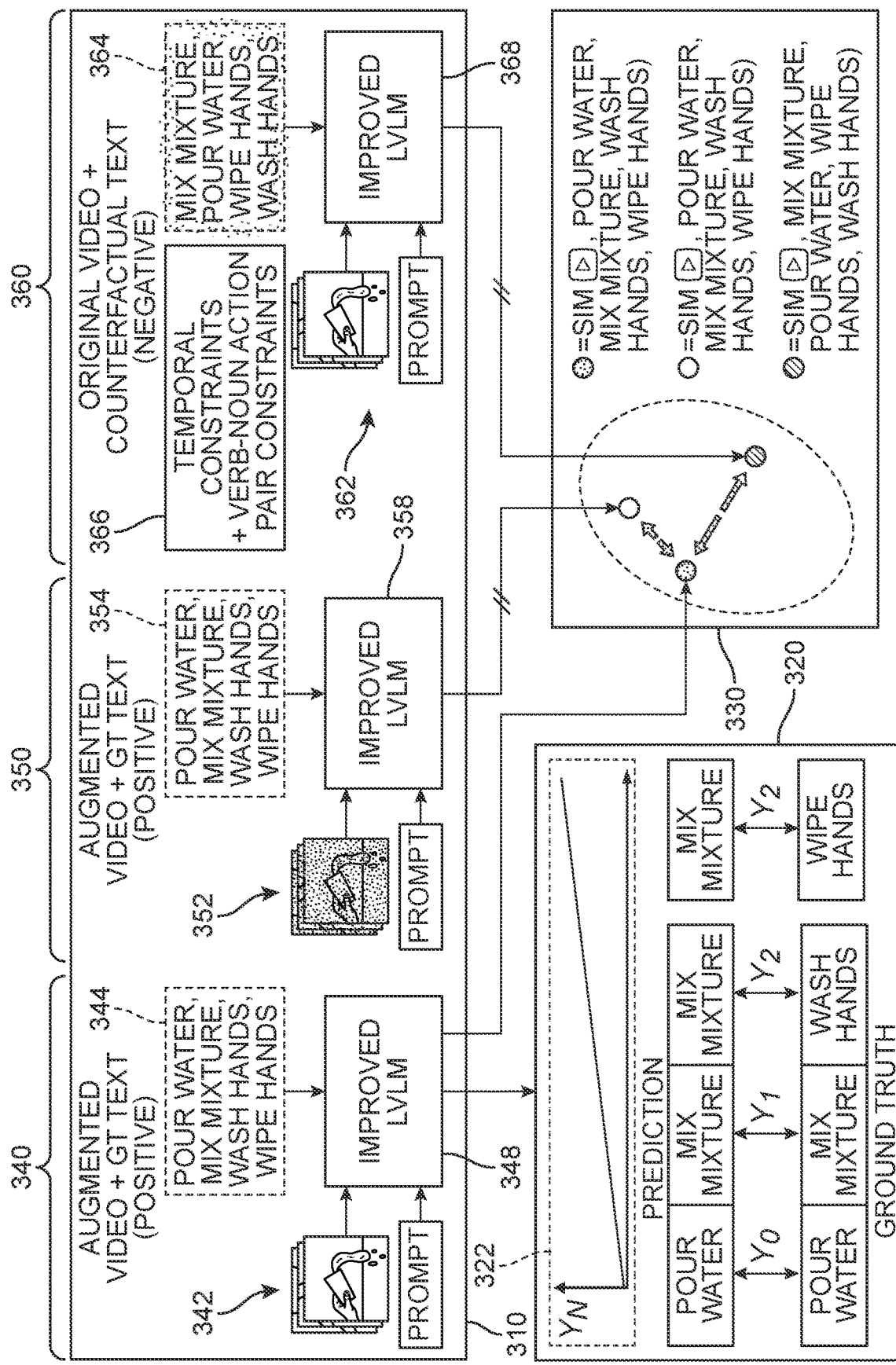
FIG. 3 depicts a technical architecture of the augmented LVLM system for plausible action anticipation, according to an embodiment.

While the above "backbone" system network is configured to ensure the alignment of the visual features with the LVLM textual space, it can be appreciated that in different embodiments, the proposed systems also improve the performance of LVLMs by incorporating information from long-horizon temporal dependencies among the actions which has been observed as serving a critical role in plausible action anticipation. Referring now to FIG. 3, a schematic diagram illustrates a technical architecture of embodiment of augmentation techniques that can be used to enhance an LVLM. As shown in FIG. 3, in order to develop the requisite temporal understanding in an LVLM, the system can be trained to optimize for two losses: (1) Plausible Action Sequence Learning loss ($L_{plau}$) and (2) Long-horizon action repetition loss ($L_{rep}$). By training the model using these two losses, the model can improve its understanding of the various temporal cues and generate a more realistic sequence of plausible and diverse future actions.

Thus, in FIG. 3, an augmentation layer 310 is supported by a long-horizon action repetition loss module 320 and a plausible action sequence learning loss module 330. At the augmentation layer 310, to facilitate plausible action anticipation, the system can rely on logical rules to create counterfactual implausible action sequences. In this example, given an input video, a positive augmentation of the video is created via plausible action sequence learning loss module 330, as well as a negative augmentation by using temporal logical and verb-noun action pair constraints via long-horizon action repetition loss module 320. Thus, the model can be trained with these two objective functions (losses): (i) Plausible Action Sequence Learning Loss ($L_{plau}$) which aligns the original video-plausible text pair closer to the positive augmentation of video-plausible text, and brings the original video-plausible text far apart from the video-counterfactual text and (ii) Long-horizon action repetition loss that ensures a diverse and less repetitive sequence of actions by adding a higher penalty to the later tokens (e.g., in this example "mix mixture" and "wipe hands") and lower penalty to immediate future actions (e.g., "pour water" and "pour water"). In FIG. 3, for purposes of illustration, a graph 322 represents an example of the linearly increasing γ penalty for the tokens over the long-horizon.

Each of these objective functions will now be discussed in greater detail below. With respect to the plausible action sequence learning loss module 330, it can be appreciated that in order for a model to be able to understand the plausible nature of an action sequence, the model should be able to leverage the implicit temporal information present in input videos. Thus, plausible action sequence learning loss module 330 provides a self-supervised plausible action sequence learning loss, $L_{plau}$. In different embodiments, the plausible action sequence learning loss module 330 can be employed to create counterfactuals based on temporal logical constraints as well as verb-noun action pair logical constraints. The plausible action sequence learning loss module 330 can then be further optimize the network by minimizing a loss with two negative log-likelihood terms that: (1) increase the probability of associating the visual modality with the temporally correct and plausible sequence of actions, and (2) decrease the probability of associating the video with the action sequences that are not plausible in the real-world and temporally incorrect. In FIG. 3, sequences of action that satisfy the temporal as well as verb-noun action pair logic constraints are deemed logically correct by the model.

For purposes of this description, temporal logical constraints for an action sequence are defined as follows: an action X that has to happen before an action Y to make it a plausible sequence in the real-world. Consider for example, given a sequence of: [take eggs→crack eggs→whisk eggs→cook omelet], that a counterfactual of this sequence of actions would be: [take eggs→cook omelet→whisk eggs→crack eggs], since a "crack eggs" step would always occur before the "cook omelet" step. Mathematically, this counterfactuality can be represented by Equation (1) below:

$$CF^{temp}(a_i, a_j) = \begin{cases} 1, & \text{if } \forall_{t \in T} (t_{a_i} \to t_{a_j}) \wedge \neg (t_{a_j} \to t_{a_i}), \\ -1, & \text{if } \forall_{t \in T} (t_{a_i} \to t_{a_j}) \wedge \neg (t_{a_j} \to t_{a_i}), \\ 0, & \text{otherwise.} \end{cases} \quad \text{Equation (1)}$$

where $CF^{temp}(a_i, a_j)$ is an action pair matrix with a value of 1 if $a_i$ always happens before $a_j$ for all the ground truth sequences $t \in T$, a value of −1 if $a_i$ always happens after $a_j$, and 0 otherwise if there is no relation between the two actions.

With this temporal logical constraint, given a text sequence t, in different embodiments, a swap operation can be performed if there is a forward or backward relation between an action pair. Hence, given a ground truth text sequence t, the operation if $a_j$ always happens before $a_p$ can be defined per Equation (2):

$$t^{cf}(a_i, a_j, a_p, a_n) = \begin{cases} a_i, a_p, a_j, a_n, & \text{if } CF^{temp}(a_j, a_p) = 1, \\ a_i, a_j, a_p, a_n, & \text{otherwise.} \end{cases} \quad \text{Equation (2)}$$

Similarly, the operation if $a_j$ always happens after $a_i$ can be defined as follows:

$$t^{cf}(a_i, a_j, a_p, a_n) = \begin{cases} a_j, a_i, a_p, a_n, & \text{if } CF^{temp}(a_j, a_i) = -1, \\ a_i, a_j, a_p, a_n, & \text{otherwise.} \end{cases} \quad \text{Equation (3)}$$

Following this stage, another logical constraint can be defined—the verb-noun action pair constraint. In this case, a counterfactual related to the subject at hand in the video can be created where a verb-noun action pair is not plausible in the real-world, for example, "cook spoon". For purposes of this description, a verb-noun action constraint can be understood to correspond to a verb-noun pair consisting of an action verb that is plausible with the object noun in the real-world.

Mathematically, verb-noun action constraint can be defined per Equation (4) below:

$$CF^{act}(a_i, a_j) = \begin{cases} 1, & \text{if } \forall_{t \in T} \neg (a_i^v \wedge a_j^n), \\ 0, & \text{otherwise.} \end{cases} \quad \text{Equation (4)}$$

where C Fact $(a_i, a_j)$ is a verb-noun pair matrix with a value of 1 if for a verb, the corresponding noun is not plausible or vice-versa in all the ground truth actions $t \in T$ and 0 otherwise if the verb-noun pair is plausible. Similar to the temporal constraints mentioned above, with this verb-noun action pair constraint, given an action, either the verb or noun can be swapped with a uniform probability to create implausible verb-noun action pairs. More specifically, given a text action pair t, the operation of a counterfactual, implausible verb-noun action pair can be defined as follows:

$$t^{cf}(a_i^v, a_i^n) = \begin{cases} (a_i^v, a_j^n) \| (a_j^v, a_i^n), & \text{if } CF^{act}(a_i^v, a_j^n) = 1, \\ (a_i^v, a_i^n), & \text{otherwise.} \end{cases} \quad \text{Equation (5)}$$

In different embodiments, for every video-text action sequence pair $(V_i, T_i)$ in the dataset $\mathcal{D}$, a temporal counterfactual as well as verb-noun action pair counterfactual $T_i^{cf}$ for every textual ground truth text sequence is created. These are collected as a dataset, $\mathcal{D}_{vtcf}$. Finally, the plausible action sequence learning loss ($\mathcal{L}_{plau}$) is defined as follows:

$$\mathcal{L}_{plau} = \mathbb{E}_{(v_i,t_i) \in \mathcal{D}_{rtct}}[-\log(z(v_i, t_i, v_i')) - \log(1 - z(v_i, t_i, t_i^{cf}))] \quad \text{Equation (6)}$$

where, in the above equation, $z(v_i, t_i, v_i')$ and $z(v_i, t_i, t_i^{cf})$ probabilities are computed as by the two equations below:

$$z(v_i, t_i, v_i') = \sigma(sim(\Delta p(v_i, t_i), \Delta p(v_i', t_i))/\tau) \quad \text{Equation (7)}$$

and $$z(v_i, t_i, t_i^{cf}) = \sigma(sim(\Delta p(v_i, t_i), \Delta p(v_i', t_i))/\tau) \quad \text{Equation (8)}$$

where $v_i$ and $v_i'$ are the visual embeddings of the original video and augmented video (respectively), $t_i$ and $t_i^{cf}$ are the text embeddings of the ground truth text sequence and counterfactual text (respectively), t is the temperature, $\sigma$ is the sigmoid function, $\Delta p$ (.,.) is the cross-modal video-text representation from LVLM after passing through a MLP projection layer (absorbed in the equation for better readability), and sim is the similarity function.

Thus, as described herein, in different embodiments, training the model to optimize the $L_{plau}$ loss allows the model to differentiate between the plausible and counterfactual/implausible action sequences by aligning the visual modality closer to the temporally correct, plausible action sequence. In training the model to "learn" this alignment, the model is able to further determine the implicit temporal information that defines the dependencies and correlations among actions in a plausible sequence.

While the plausible action sequence learning loss $\mathcal{L}_{plau}$ described above can be used to augment the model for purposes of understanding the implicit temporal information present in the action sequences, another plausibility-enhancing feature provided by the disclosed embodiments is directed to reducing the repetition of actions and in turn generating more diverse actions, as represented by the long-horizon action repetition loss module 320. Although the model can generate accurate, temporally correct, and diverse actions over a short temporal window, there may be an increase in the frequency at which a particular action is identified over a longer "horizon". In other words, the further out the model projects a forecast of the upcoming actions in a sequence, the more likely that an action will be repeated incorrectly. To mitigate this effect, the model can be further trained by enforcing a larger penalty on the actions that are indicated to occur more frequently over a longer horizon in the temporal window and conversely enforce a smaller penalty to those actions that are more immediately proximate to the observed actions in the video.

This approach can be represented by defining a penalty term of $\gamma_t$ over the negative log-likelihood of the probability per Equations (9) and (10) below:

$$p_t = \frac{\exp(\hat{y}_t)}{\sum_j \exp(\hat{y}_j)}, \quad \text{Equation (9)}$$

$$\mathcal{L}_{rep}(P_t) = -\gamma_t \log(p_t) \quad \text{Equation (10)}$$

where $\hat{y}_t$ is the output from the language model for the t'th token over which a softmax operation is applied to obtain the probability $p_t$. In addition $\hat{\gamma}_t$ is the $\gamma$ value temporally unique to the t'th token following the order, $\gamma_0 < \gamma_1 < \gamma_2 < \ldots < \gamma_N$. Thus, by optimizing the $\mathcal{L}_{rep}$ loss, the model is penalized significantly more for the actions that occur over a longer horizon (e.g., further out in time) and less penalized for immediate actions (e.g., closer to the present time). This interplay promotes a dynamic regulation of the repetitions in the sequence, while ensuring more diverse actions are outputted in the generated text.

In different embodiments, by optimizing for these two losses, the accuracy of the model in predicting the next steps in a sequence can be significantly increased. The overall combination of the influence of the long-horizon action repetition loss module 320 and plausible action sequence learning loss module 330 on the model's training can then be defined by:

$$\mathcal{L} = \alpha \mathcal{L}_{plau} + \beta \mathcal{L}_{rep} \quad \text{Equation (11)}$$

where $\alpha$ and $\beta$ are the weight hyper-parameter for the two losses.

In order to better illustrate the advantages offered by the proposed embodiments for the reader, additional details are now provided regarding a test case performed that showcases the benefits of the LVLM training. For this experiment, videos of size 224×224 with Ego4D containing 8 clips with 4 frames (for a total of 32 frames), as well as an EPIC-Kitchens-100 with 32 frames were processed. The pre-trained Qformer model (BLIP2-FlanT5 from BLIP2) with the number of query tokens of 32 was selected, with the ViTG/14 as the vision encoder. The model was trained end-to-end with a learning rate of $1e^{-5}$, for 100 epochs, and $\alpha=0.5$ and $\beta=0.5$. The language model used was the Equation (11)LLaMA-2-7B. For the long-horizon action repetition loss, $\mathcal{L}_{rep}$, the experiment applied a $\gamma$ in the uniform distribution from [0,2] with the number of steps equal to the number of output tokens from the language model. For the plausible action sequence learning loss $\mathcal{L}_{plau}$, a video augmentation of color jitter, random horizontal flip, and a random rotation of 10 degrees was applied.

The model was then evaluated on two action anticipation datasets: Ego4D and EPIC-Kitchens-100. The Ego4D is a largescale egocentric dataset covering diverse indoor and outdoor scenarios including the home, workplace, etc. The dataset includes 3670 hours of videos with 115 verbs and 478 nouns. Videos from the Forecasting and Hand-Object interaction subset of Ego4D were selected to evaluate the model's performance and obtain results on the validation set. In Ego4D, a video and a stopping time is given, and the model is prompted to predict N sets of sequences having Z number of actions in the form of verbnoun pairs, $$\{\{(\hat{v}_{z,n}, \hat{n}_{z,n})\}_{z=1}^{Z}\}_{n=1}^{N},$$

where $\hat{v}_{z,n}$ is the predicted verb and $\hat{n}_{z,n}$ is the predicted noun.

In addition, EPIC-Kitchens-100 is an egocentric dataset of a kitchen-based environment. The dataset includes 100 hours of egocentric videos with 97 verbs and 300 nouns. For this dataset, given an action segment that starts at time $\tau_s$, the model is tasked to predict the anticipated action by observing a video segment of duration $[\tau_s-(\tau_0+\tau_a), \tau_s-\tau_a]$ where $\tau_0$ is the observation time and $\tau_a$ is the anticipation time. The anticipation time $\tau_a$ refers to how much in advance the model has to anticipate the action. In other words, anticipation time $\tau_a$ is the time between the end time of observed video and the starting time of the first action to be anticipated. The video during the anticipation period $\tau_a$ is unobserved. Following the standard from the literature, $\tau_a=1$ s.

In order to evaluate the performance of the augmented LVLM, the experimental output was compared to outputs provided by several other LVLMs and their action anticipation scores, the results of which are discussed below. These baselines include performance of Video-LLaMA and Video-LLM, as well as the transformer and LSTM-based approaches for action anticipation along with text-based large language models. Furthermore, an ablation study was conducted in which results of an embodiment of the augmented LVLM with and without the $\mathcal{L}_{plau}$ and $\mathcal{L}_{rep}$ objective functions was performed to better demonstrate the effect of each of these components on the final performance of the model. An ablation using negative samples from other videos was also conducted.

Referring to Tables 1 and 2 below, the reader may observe that the performance by the augmented LVLM greatly exceeded those of the baselines. This result can be attributed to the improved model's ability to understand the plausibility in the action sequences and leverage the temporal correlations among the actions in a sequence. Table 1 presents the performance related to long-term action anticipation on Ego4D. In this case, the lower the value of the score, the better the performance, and the proposed LVLM ("PlausiVL") outperformed all of the previous baselines, including models incorporating transformer and LSTM-based architectures, across verbs, nouns, and actions.

TABLE 1

| Method | ED@(Z = 20) ↓ | |
|---|---|---|
| | Verb | Noun |
| RepLAI | 0.755 | 0.834 |
| SlowFast | 0.745 | 0.779 |
| ICVAE | 0.741 | 0.739 |
| HierVL | 0.723 | 0.734 |
| Video + CLIP | 0.715 | 0.748 |
| AntGPT | 0.700 | 0.717 |
| Video LLM | 0.721 | 0.725 |
| Video LLaMA | 0.703 | 0.721 |
| PlausiVL | 0.679 | 0.681 |

As shown in Table 1 above, the "PlausiVL" shows performance gain towards action anticipation, while other large video-language models have only explored the visual-text alignment and lack the temporal understanding needed for the action anticipation. To further illustrate how the proposed system adopts temporal understanding, PlausiVL is compared with Video-LLM and Video-LLaMA in Table 1, reflecting an improvement of 4.2% and 2.4%, respectively on verbs. Furthermore, in Table 2 below, the performance of action anticipation with the EPIC-Kitchens-100 dataset on class-mean Top-5 recall (%) is presented. In this case, the higher the value of the score, the better the performance, and again, the proposed LVLM ("PlausiVL") outperformed all of the previous baselines.

TABLE 2

| Method | Class-mean Top-5 recall (%) ↑ | | |
|---|---|---|---|
| | Verb | Noun | Action |
| RU-LSTM | 23.20 | 31.40 | 14.70 |
| Temporal Aggregation | 27.80 | 30.80 | 14.00 |
| Video LLM | — | — | 15.40 |
| AFFT | 22.80 | 34.60 | 18.50 |
| AVT | 28.20 | 32.00 | 15.90 |
| MeMViT | 32.20 | 37.00 | 17.70 |
| RAFTformer | 33.80 | 37.90 | 19.10 |
| InAViT | 52.54 | 51.93 | 25.89 |
| Video LLaMA | 52.90 | 52.01 | 26.05 |
| PlausiVL | 55.62 | 54.23 | 27.60 |

In Table 2, an improvement of 2.72% and 2.22% respectively on verbs for EPIC-Equation (11)Kitchens-100 is demonstrated. The improvement in performance for PlausiVL underscores the enhanced capacity of the model to discern temporal dependencies among the actions and generate more accurate and plausible action sequences.

Figure 4:
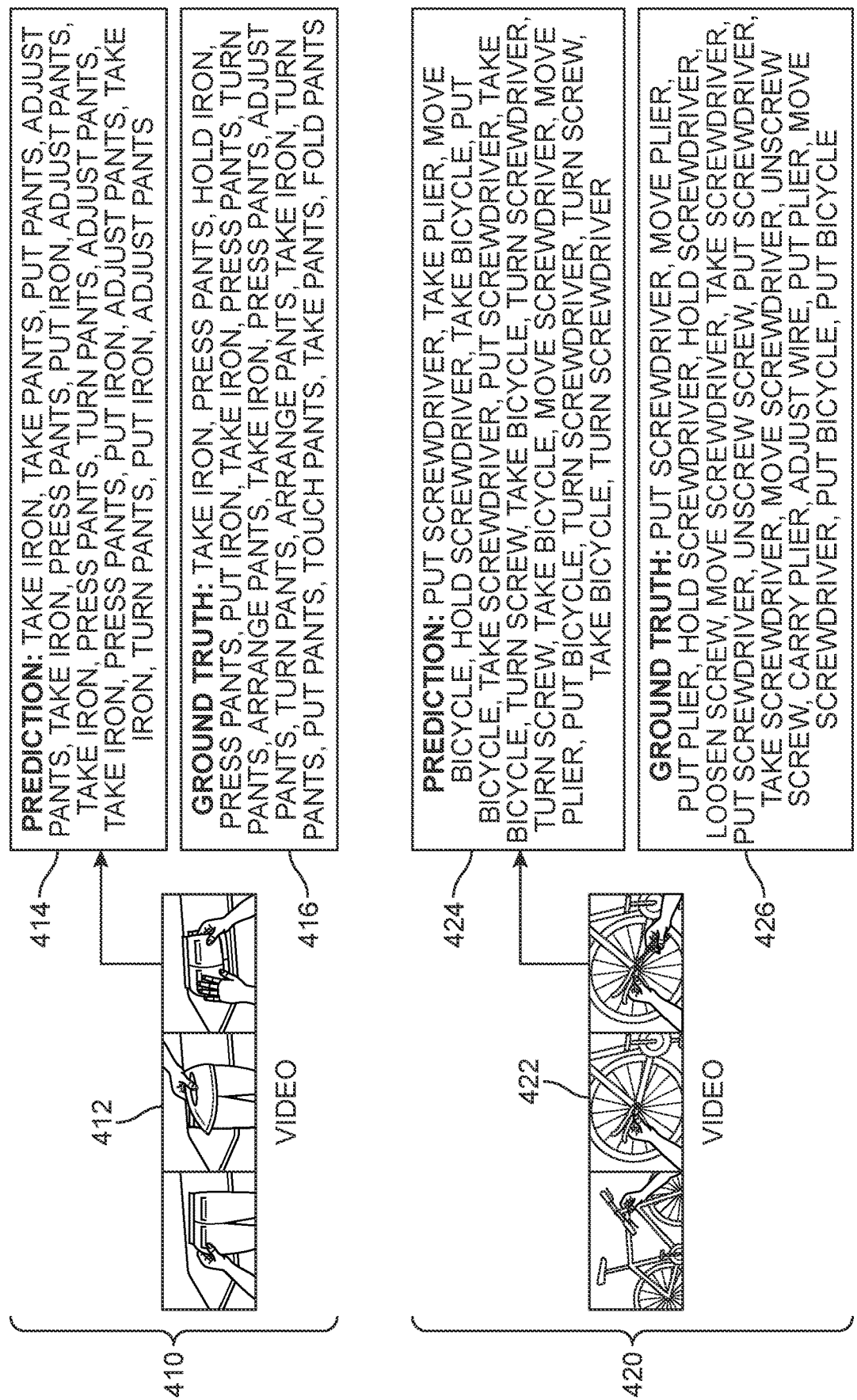
FIG. 4 are schematic representations of some qualitative results produced by the augmented LVLM system when a plausible action anticipation framework is employed, according to an embodiment.

To better illuminate the advantages offered by the PlausiVL model, qualitative results are presented in the diagram of FIG. 4. In this diagram, the quality of the augmented LVLM's generated sequence in comparison to the ground truth can be better appreciated. In a first scenario 410, given a first video 412, a first prediction output 414 was generated. The content of first prediction output 414 can be seen to correlate well with a first ground truth action sequence 416 associated with the first video 412. Similarly, with respect to a second scenario 420, given a second video 422, a second prediction output 424 was generated. The content of second prediction output 424 can be seen to correlate well with a second ground truth action sequence 416 associated with the first video 412. In other words, the improved model was able to generate action sequences that satisfy the temporal logic constraints and are diverse with less repetitions. Thus, the PlausiVL model's approach is able to understand the activity that takes place in each of the videos and correctly anticipate the temporal future action sequence accordingly.

Furthermore, the test data obtained indicated that the inclusion of the $L_{plau}$ loss component allowed the model to learn plausible future action sequences. For example, to assess if the $L_{plau}$ loss function (plausible action sequence learning loss) is able to create a real-world understanding of temporal plausibility of an action sequence in the model, the PlausiVL output with $L_{plau}$ is compared at row (1) of Table 3 below, with the PlausiVL output without $L_{plau}$ being represented at rows (3) and (4) in the same table.

TABLE 3

| $L_{plau}$ | $L_{rep}$ | Ego4D ED@(Z = 20) ↓ | | EPIC-Kitchens-100 Class-mean Top-5 recall (%) ↑ | | |
|---|---|---|---|---|---|---|
| | | Verb | Noun | Verb | Noun | Action |
| ✓ | ✓ | 0.679 | 0.683 | 55.62 | 54.23 | 27.60 |
| ✓ | | 0.686 | 0.698 | 54.50 | 53.60 | 26.67 |

TABLE 3-continued

| $L_{plau}$ | $L_{rep}$ | Ego4D ED@(Z = 20) ↓ | | EPIC-Kitchens-100 Class-mean Top-5 recall (%) ↑ | | |
|---|---|---|---|---|---|---|
| | | Verb | Noun | Verb | Noun | Action |
| ✓ | | 0.691 | 0.707 | 54.15 | 53.03 | 26.21 |
| | | 0.703 | 0.721 | 52.90 | 52.01 | 26.05 |

Table 3 presents the ablation performance of the model with respect to components $L_{plau}$ and $L_{rep}$ with dataset Ego4D, as well as the dataset EPIC-Kitchens-100 on class-mean Top-5 recall (%). In the first case, the lower the value of the score, the better the performance, while in the second case, the higher the value of the score, the better the performance. In the first row, both components are retained. It can be observed that there is a dip in the performance as each component is removed, confirming that the two losses $L_{plau}$ and $L_{rep}$ play an important role in augmenting model performance. More specifically, upon removing $L_{plau}$, there is a drop in performance of 1.2% on verbs for Ego4D and 1.47% for verbs of EPIC-Kitchens-100 (e.g., see the first row and third row), affirming that training a model with $L_{plau}$ as an objective function allows the model to learn the implicit temporal information of action correlations in a sequence. Through learning to differentiate between the plausible and not plausible action sequences and aligning the video representations closer to the plausible action sequences, the model learns an effective video-text alignment that facilitates generation of more accurate, plausible future action sequences.

Similarly, the test data obtained indicated that the inclusion of the $L_{rep}$ loss component allowed the model to learn plausible future action sequences. For example, to assess if the $L_{rep}$ loss function (long-horizon action repetition loss) is able to reduce the likelihood of action repetition and promote action diversity over long horizons in the model, the PlausiVL output with $L_{rep}$ is compared at row (1) of Table 3 above, with the PlausiVL output without $L_{rep}$ being represented at rows (2) and (4) in the same table. More specifically, upon removing $L_{rep}$, there is a drop in performance of 1.5% on nouns for Ego4D and 0.63% for nouns with EPIC-Kitchens-100, affirming that training a model with $L_{rep}$ and thereby applying a greater penalty to long horizon actions, there is a reduction in the repetition of actions outputted in the sequence, improving the generation of plausible action anticipation sequences.

Furthermore, a comparison between the large video-language model vs large text-language model was evaluated with respect to the task of action anticipation. More specifically, the proposed PlausiVL model was compared to AntGPT (e.g., a text-based LLM). A performance gain of 2.1% on verbs and 3.6% on nouns for the Ego4D dataset was found using the PlausiVL approach, in part due to the text-based LLM discarding all of the visual and temporal information present in the videos. This can significantly detract from performance as the task of action anticipation is highly dependent on visual spatio-temporal information to facilitate an accurate understanding of the real-world temporal flow of actions and anticipate actions. Thus, incorporating visual modality can give crucial information such as the environment of the agent, the objects that are interacted with, and other objects in the scene that might be the subject of interactions later in the future. Such vital information is lost when converting a video into textual actions or into a summary.

To further emphasize the enhanced plausibility, reduction in repetition, and improved quality the PlausiVL's generated text, a BLEU score and repetition score were also calculated. In this case, the repetition score refers to an average of the number of actions that are repeated in an action sequence, while the BLEU score measures the similarity between the model's generated text and the ground truth. These scores with respect to the Ego4D dataset are reported in Table 4 below.

TABLE 4

| | BLEU Score ↑ | Repetition Score ↓ |
|---|---|---|
| Video-LLaMA | 37.89 | 7.12 |
| PlausiVL | 45.54 | 5.87 |
| Ground Truth | 100.00 | 4.33 |

In Table 4, with respect to the BLEU score, a higher value indicates better performance, while for the repetition score, a lower score indicates better performance. It can be observed that both the BLEU score and repetition score were better for PlausiVL when compared with Video-LLaMA. In other words, a better BLEU score for the PlausiVL model relative to the baseline corroborates the result that the generated text from the augmented LVLM is a more plausible action sequence, thus emphasizing the efficacy of the two objective functions. Similarly, a lower repetition score relative to the baseline reflects the model's decrease in repetitive actions in the generated sequence. More specifically, the PlausiVL approach only repeated 5.87 actions in an action sequence on average whereas the Video-LLaMA repeated an average of 7.12 actions. This can be compared to the average repetition of 4.33 actions in the ground truth action sequences. Moreover, a lower edit distance metric in Table 1 also indicated less repetition and more plausibility in the generated text as a lower metric would mean fewer substitutions were made to bring the output text closer to the ground truth.

Finally, Table 5 below shows the effect of ablation using negative samples from other videos for contrastive learning, where a lower score indicates a better performance.

TABLE 5

| Method | Verb | Noun |
|---|---|---|
| CLR Paradigm | 0.726 | 0.766 |
| PlausiVL w/ $L_{plau}$ | 0.686 | 0.698 |
| PlausiVL | 0.679 | 0.681 |

Figure 5:
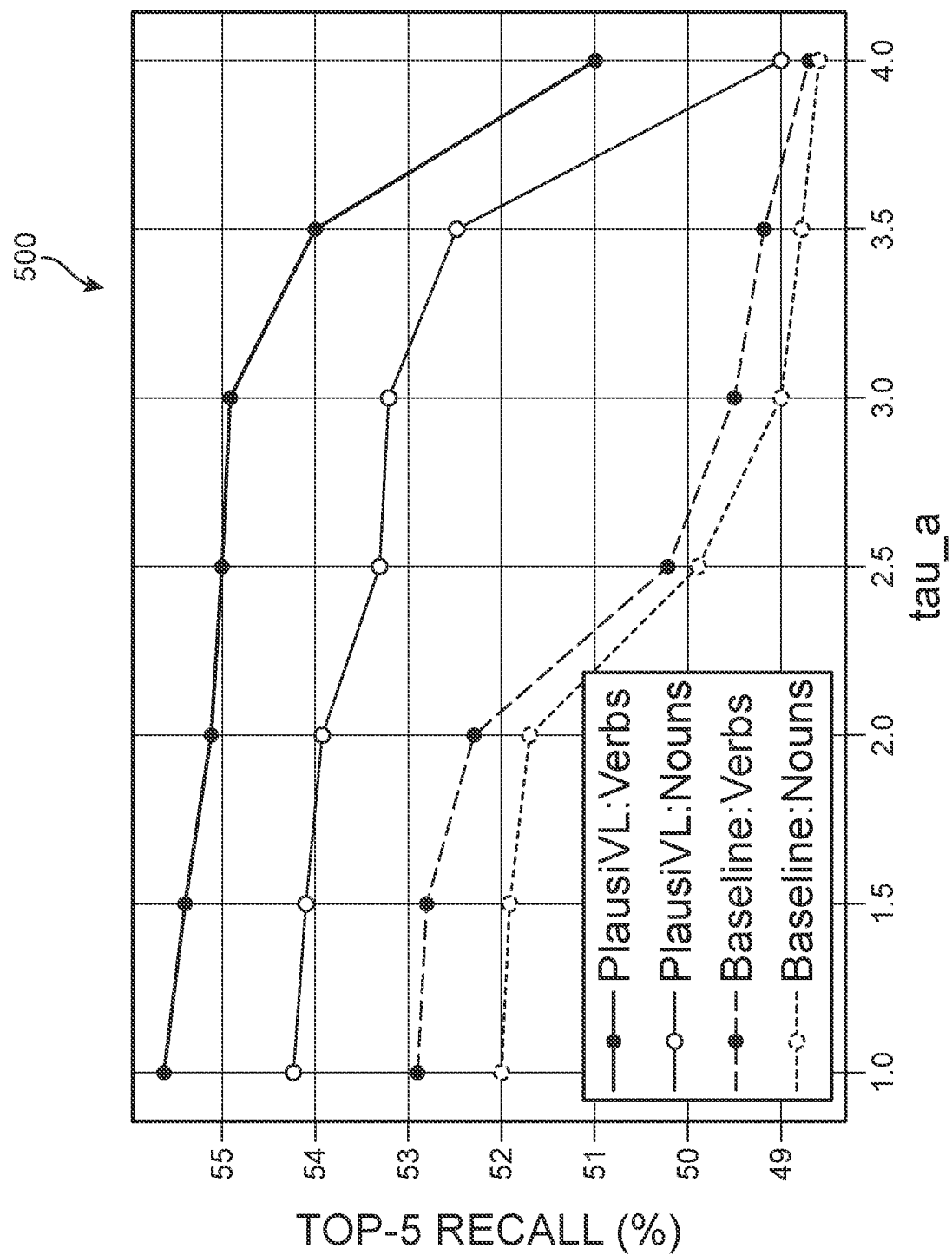
FIG. 5 is a graph presenting some results showcasing the superior performance of the augmented LVLM when compared to other baseline model outputs (e.g., models without the proposed plausible action anticipation framework), according to an embodiment.

As shown in Table 5, PlausiVL remains effective even with extended anticipation time $T_a$: A changing $T_a$ versus accuracy on the dataset Epic-Kitchen-100 (Equation (11) EK100) is analyzed in graph 500 presented in FIG. 5. Graph 500 presents an analysis of $T_a$ vs. verb-noun class-mean Top-5 recall (%) accuracy on EK100, where a higher score indicates better performance. The reader can observe in graph 500 that the PlausiVL approach remains robust until approximately $T_a$=3.5s. In contrast, Video-LLaMA is only robust until $T_a$=2.0s for the same dataset. These results support the proposed model's capacity to continue to predict future actions even with a far-out anticipation time.

In different embodiments, the proposed systems can be incorporated into a wide range of computing devices to improve the performances and user experiences with those devices, such as but not limited to autonomous vehicles, human-robotic symbiotic systems, wearable assistants, and other interactive technology. Simply for purposes of illustration, two example scenarios in which the augmented LVLM is implemented are now provided in FIGS. 6A and 6B.

Figure 6A:
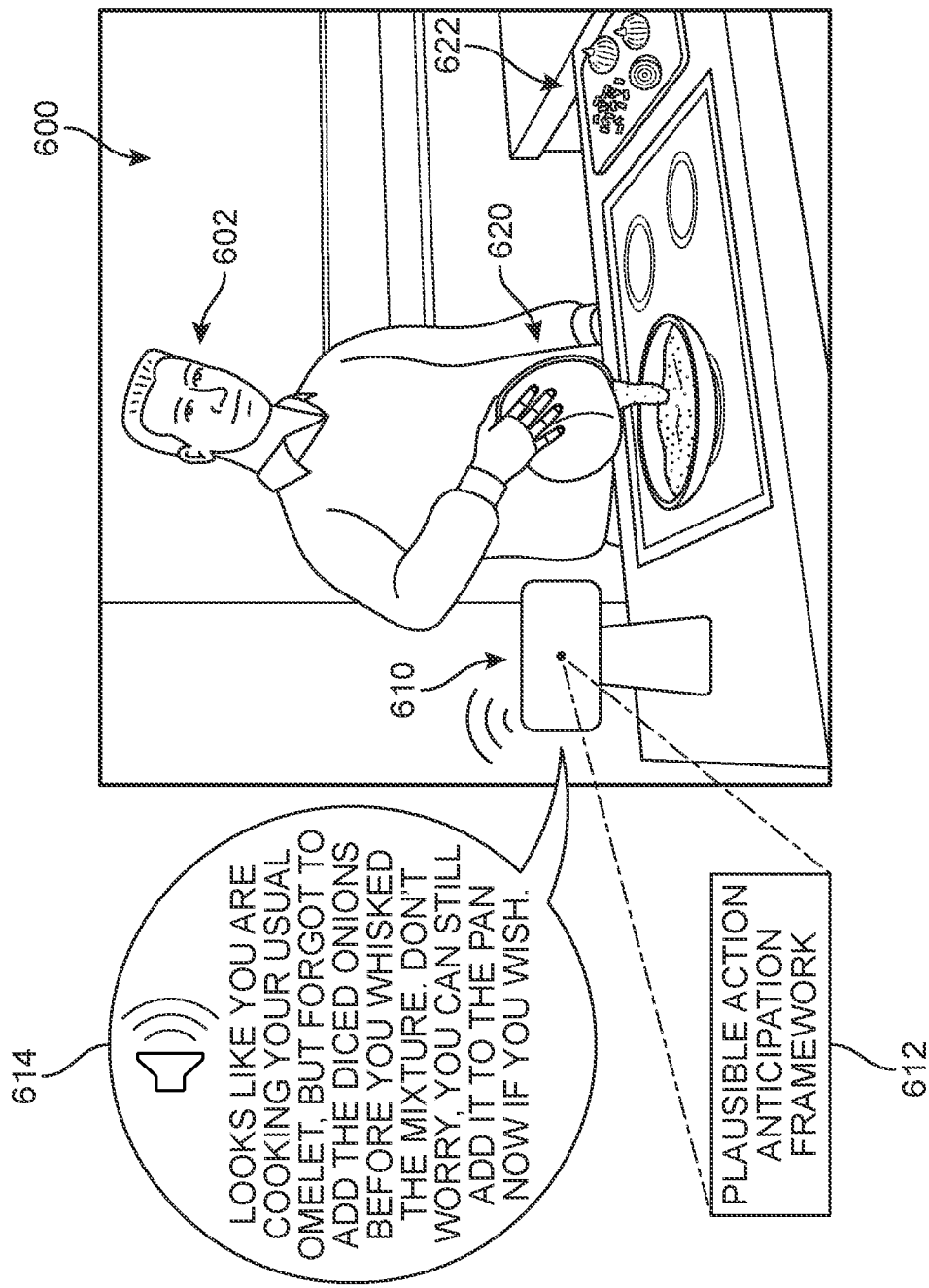
FIG. 6A illustrates an example by which the augmented LVLM can be incorporated into a virtual assistant computing device, according to an embodiment.

Referring first to FIG. 6A, a kitchen environment ("kitchen") 600 is depicted that includes a first person 602 and a smart assistant 610 (including an onboard video camera and speakers). In different embodiments, the smart assistant 610 includes a local instance of an LVLM which has been augmented with a plausible action anticipation framework 612. As the video camera observes the events, actions, and behavior in kitchen 600, including a current action 620 (e.g., pouring mixture into a frying pan), it can evaluate contextual data 622 (objects and items in the surrounding area) as well as the series of actions that occurred prior to the current action 620 (e.g., set up ingredients station, break eggs into a bowl, add spices, turn on stove, mix batter in bowl). Based on these actions, the plausible action anticipation framework 612 can discern or generate a predicted intent for the person as to the most likely overall task that is being performed, and identify if any standard steps in the sequence of actions comprising the predicted task have been omitted and steps that remain in the predicted trajectory of actions. This prediction can be based on the device's previous observations (video data) of persons in the kitchen performing similar sequences of actions, or training video data with ground truth labels of other kitchens. For example, in this case, the plausible action anticipation framework 612 recognizes that the first person 602 is engaged in cooking their morning omelet. However, one of the steps that is usually included—adding diced onions—did not take place at the usual point in the sequence associated with this task. In response to detecting this likely omission, the smart assistant 610 can automatically generate guidance (e.g., via speakers or text on a screen) that reminds the first person 602 of the missing step. In FIG. 6A, the smart assistant 610 produces an audio message 614 in real-time that addresses the omitted step (e.g., "Looks like you are cooking your usual omelet, but you forgot to add the diced onions before you whisked the mixture. Don't worry, you can still add it to the pan now if you wish"), thereby acknowledging the predicted task, the surrounding actions, and the omitted action, as well as whether there is still opportunity to correct the mistake by performing the action out of order. With such dynamic, real-time feedback, the tasks performed by the first person 602 can be monitored, supported, and facilitated by nuanced, gentle recommendations that allow the first person 602 to improve their output.

Figure 6B:
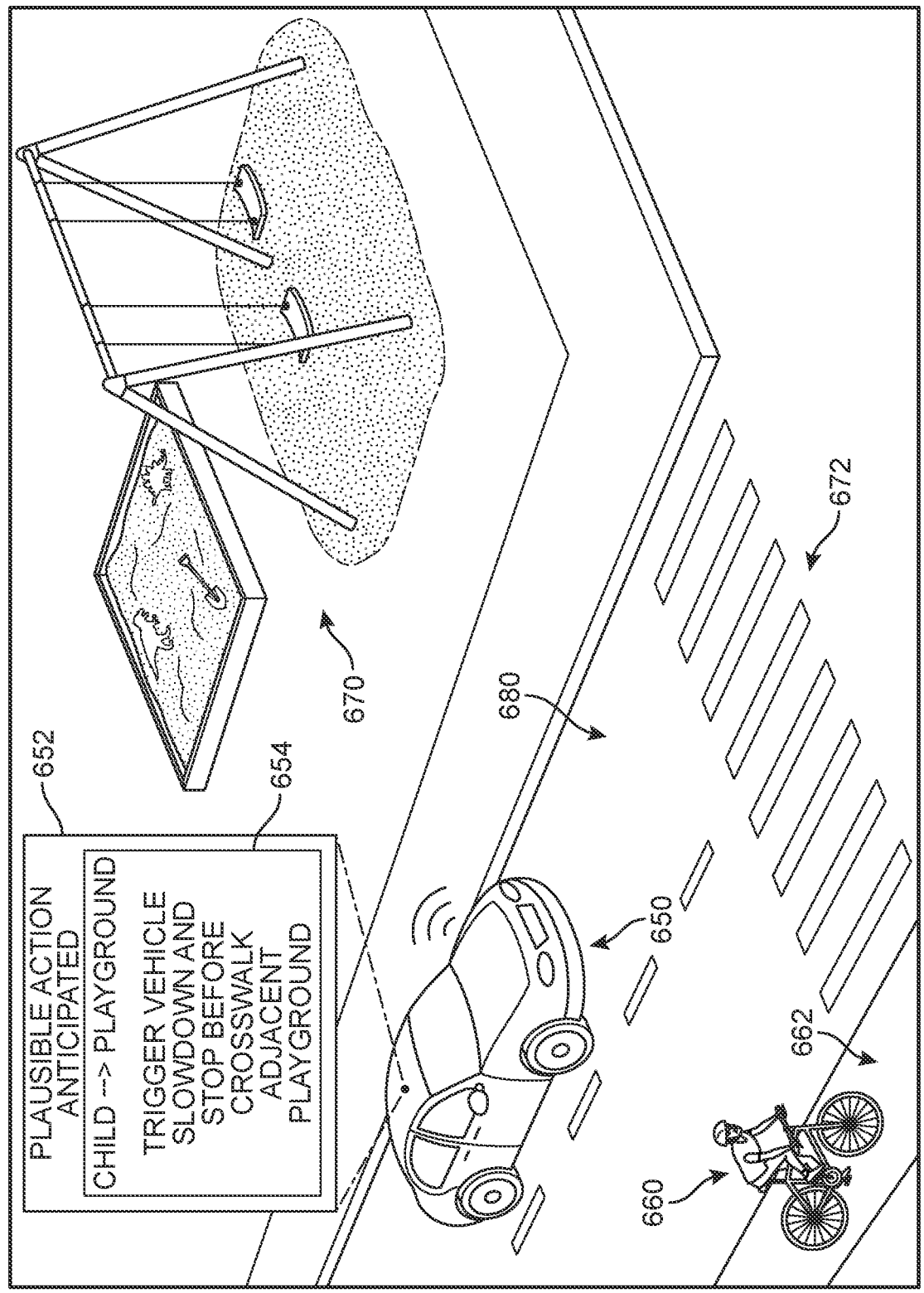
FIG. 6B illustrates an example by which the augmented LVLM can be incorporated into an autonomous vehicle, according to an embodiment.

As another example, FIG. 6B presents a second scenario in which an autonomous vehicle (AV) 650 is driving vehicle occupant(s) down a stretch of roadway 680. The onboard computing device for AV 650 can be understood to include an LVLM that is augmented with a plausible action anticipation framework 652. As video and other sensor data of the vehicle's surroundings are received at the LVLM, the plausible action anticipation framework 652 can identify nearby landmarks and objects, such as a playground 670 on one side of the roadway 680, a child biker 660 on the opposing side of the roadway 680, and a crosswalk 672 that extends from the side with the playground 670 to the side where the child biker 660 is traveling. In addition, the direction in which child biker 660 is moving is oriented is generally the same as the crosswalk 672. Based on this incoming, real-time data, the plausible action anticipation framework 652 can generate an evaluation and prediction 654 that indicates the most likely next behavior/intent of the child biker 660 is that they will reach the part of their sidewalk adjacent to the crosswalk 672, and then turn in a leftward direction to travel across the crosswalk 672 in order to reach the playground 670. This prediction can be based on previous observations (video data) of children walking or biking outside when in proximity to a playground, performing similar sequences of actions.

In other words, even though the child biker's 660 current trajectory does not indicate or suggest that they will be turning at all, only that they are biking on the sidewalk, the contextual data such as the child biker's approximate age, their bike, the crosswalk, and the use of playgrounds by children of this child's age group, can lead to prediction 654 that the child will be moving across the roadway 680 soon. Rather than stop abruptly or possibly with an unsafe delay when the child suddenly turns left on their bike and potentially fails to look for oncoming traffic, the AV 650 can anticipate the child's behavior and automatically adjust its operation and performance accordingly (e.g., "Child→playground/Trigger vehicle slowdown and stop before crosswalk adjacent to playground").

As described herein, a plausibility action anticipation framework can leverage the generative capabilities of large video-language models to offer credible, factual, and logical generation of action anticipation sequences. The augmentation incorporates a plausible action sequence learning loss which helps the model to differentiate between the plausible and not plausible (counterfactual) action sequences, and thus learn anticipation-related temporal cues. The augmentation further incorporates a long-horizon action repetition loss that applies a higher penalty on the actions that happen more often over a longer temporal window and are more prone to repetition, thus mitigating action repetition and ensuring more diverse actions.

Figure 7:
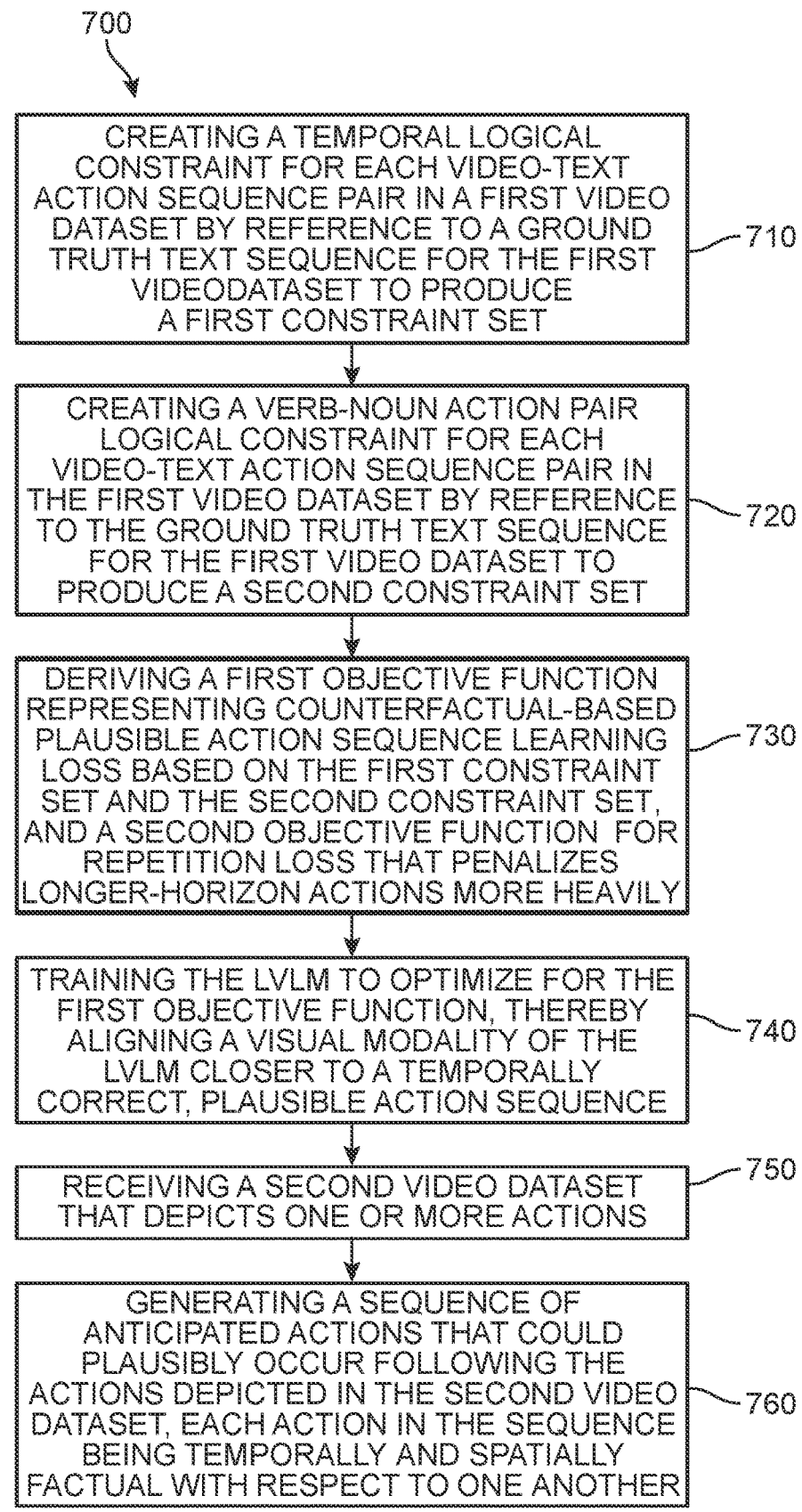
FIG. 7 is a flow chart depicting a method of augmenting a large video language model (LVLM) for anticipating plausible action sequences, according to an embodiment.

FIG. 7 is a flow chart illustrating an embodiment of a method 700 of augmenting a large video language model (LVLM) for anticipating plausible action sequences. At 710, the method may include creating a temporal logical constraint for each video-text action sequence pair in a first video dataset by reference to a ground truth text sequence for the first video dataset to produce a first constraint set. At 720, the method includes creating a verb-noun action pair logical constraint for each video-text action sequence pair in the first video dataset by reference to the ground truth text sequence for the first video dataset to produce a second constraint set. The method 700 also includes at 730, deriving a first objective function representing counterfactual-based plausible action sequence learning loss based on the first constraint set and the second constraint set. In addition, at 740, the method includes training the LVLM to optimize for the first objective function, thereby aligning a visual modality of the LVLM closer to a temporally correct, plausible action sequence, and at 750 the method includes receiving, at the trained LVLM, a second video dataset that depicts one or more actions. Furthermore, the method can include at 760 generating, via the trained LVLM, a sequence of anticipated actions that could plausibly occur following the actions depicted in the second video dataset, each action in the sequence being temporally and spatially factual with respect to one another.

In different embodiments, the method 700 may include additional processes or aspects. In one example, the method also includes deriving a second objective function representing long-horizon action repetition loss based on an application a larger penalty to actions that occur increasingly often in the ground truth text sequence over time in the first video dataset and a smaller penalty to actions that occur less often over time. In some embodiments, the method can also include training the LVLM to optimize for the second objective function, thereby promoting a greater diversity in actions identified by the LVLM when generating plausible action sequences.

In another embodiment, the method can include receiving, at the LVLM, the first video dataset; and extracting video-frame level representations from the first video dataset via a frozen video encoder. In different embodiments, the method can also include passing each frame of the extracted video-frame level representations through a Querying Transformer to obtain a set of Q-former features. In some embodiments, the method can include applying a frame position embedding layer and a clip-position embedding layer to each feature of the Q-former features to produce an embedded feature set. In one embodiment, the method can further include aggregating spatio-temporal information of the first video clip by passing the embedded feature set through a video-based Querying Transformer to produce a set of video embeddings describing one or more visual prompts. In some embodiments, the augmented LVLM is implemented in an onboard computing device for an autonomous vehicle, and predictions generated by the augmented LVLM cause changes in operation of the autonomous vehicle. In another example, the augmented LVLM is implemented in a computing device for digital or virtual assistant, and the presentation of information by the virtual assistant is influenced by the predictions generated by the plausible action anticipation framework.

As a general matter, an embodiment of a server or other computing system for a plausible anticipation action framework is described below. As a general matter, the server may include circuitry, a memory, an I/O device, and a network interface. The circuitry may be coupled to the memory, the I/O device, and the network interface, through wired or wireless connections of the communication networks.

The circuitry may include suitable logic, circuitry, and/or interfaces that may be configured to execute program instructions associated with different operations to be executed by the server. For example, some of the operations may include, but are not limited to, reception of electric charging information from the transfer devices, transmission of the received electric charging information from each of the transfer devices to the electronic device associated with the energy regulatory authority, reception of the renewable credit information from the electronic device based on the transmitted electric charging information, and transmission of the first credit information to each of the transfer devices.

The circuitry may include any suitable special-purpose or general-purpose computer, computing entity, or processing device including various computer hardware or software modules and may be configured to execute instructions stored on any applicable computer-readable storage media (for example the memory). The circuitry may be implemented based on a number of processor technologies known in the art. For example, the circuitry may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry may include any number of processors configured to, individually or collectively, perform any number of operations of the server, as described in the present disclosure. Examples of the circuitry may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory may include suitable logic, circuitry, interfaces, and/or code that may be configured to store the set of instructions executable by the circuitry. The memory may be configured to store the registration information for the transfer devices. The memory may be further configured to store the electric charging information, the renewable credit information, and the monetary information. Examples of implementation of the memory may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device may include suitable logic, circuitry, interfaces, and/or code that may be configured to receive user inputs and generate outputs in response to the received user inputs. The I/O device may receive the registration information associated with a new electric charging facility device as the user-input. For example, the server may receive the user-input from an executive of the organization associated with or handling the server for the credit management. The registration information may indicate a unique identifier or a location where the new electric charging facility device is positioned. The I/O device may include various input and output devices, may be configured to communicate with the circuitry. Examples of the I/O device may include, but are not limited to, a touch screen, a keyboard, a mouse, a joystick, a microphone, a display device, a speaker, and/or an image sensor.

The network interface may include suitable logic, circuitry, and interfaces that may be configured to facilitate communication between the circuitry, the electric charging facility devices, the electronic device of the energy regulatory authority, the electric grid device of the electric grid, the communication device of the renewable energy generation sources, and the electronic apparatus of the vehicle, via the communication network. The network interface may be implemented by use of various known technologies to support wired or wireless communication of the server with the communication network. The network interface may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging and a Short Message Service (SMS).

While the server in this case includes the circuitry, the memory, the I/O device, and the network interface, the disclosure should not be construed as limiting the server and may include more or less components to perform the same or other functions of the server. Details of the other functions and the components have been omitted from the disclosure for the sake of brevity. The functions or operations executed by the server may be performed by the circuitry. It should be understood that the server may be combined with the transfer devices to form a system. The transfer devices may be communicably coupled with the network Interface, via a communication network.

The following includes definitions of selected terms employed herein. The definitions include various examples and/or forms of components that fall within the scope of a term and that may be used for implementation. The examples are not intended to be limiting. Aspects of the present disclosure may be implemented using hardware, software, or a combination thereof and may be implemented in one or more computer systems or other processing systems. In one example variation, aspects described herein may be directed toward one or more computer systems capable of carrying out the functionality described herein. An example of such a computer system includes one or more processors. A "processor", as used herein, generally processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

The apparatus and methods described herein and illustrated in the accompanying drawings by various blocks, modules, components, circuits, steps, processes, algorithms, etc. (collectively referred to as "elements") may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

The processor may be connected to a communication infrastructure (e.g., a communications bus, cross-over bar, or network). Various software aspects are described in terms of this example computer system. After reading this description, it will become apparent to a person skilled in the relevant art(s) how to implement aspects described herein using other computer systems and/or architectures.

Computer system may include a display interface that forwards graphics, text, and other data from the communication infrastructure (or from a frame buffer) for display on a display unit. Display unit may include display, in one example. Computer system also includes a main memory, e.g., random access memory (RAM), and may also include a secondary memory. The secondary memory may include, e.g., a hard disk drive and/or a removable storage drive, representing a floppy disk drive, a magnetic tape drive, an optical disk drive, etc. The removable storage drive reads from and/or writes to a removable storage module in a well-known manner. Removable storage module, represents a floppy disk, magnetic tape, optical disk, etc., which is read by and written to removable storage drive. As will be appreciated, the removable storage module includes a computer usable storage medium having stored therein computer software and/or data.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals, which may be electronic, electromagnetic, optical or other signals capable of being received by communications interface. These signals are provided to communications interface via a communications path (e.g., channel). This path carries signals and may be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals. These computer program products provide software to the computer system. Aspects described herein may be directed to such computer program products. Communications device may include communications interface.

Computer programs (also referred to as computer control logic) are stored in main memory and/or secondary memory. Computer programs may also be received via communications interface. Such computer programs, when executed, enable the computer system to perform various features in accordance with aspects described herein. In particular, the computer programs, when executed, enable the processor to perform such features. Accordingly, such computer programs represent controllers of the computer system.

In variations where aspects described herein are implemented using software, the software may be stored in a computer program product and loaded into computer system using removable storage drive, hard disk drive, or communications interface. The control logic (software), when executed by the processor, causes the processor to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s). In yet another example variation, aspects described herein are implemented using a combination of both hardware and software.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps or processes. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art may readily appreciate that the sequences may be varied and still remain within the spirit and scope of the present embodiments.

We claim:

1. A method for augmenting a large video language model (LVLM) for anticipating plausible action sequences, the method comprising:
    creating a temporal logical constraint for each video-text action sequence pair in a first video dataset by reference to a ground truth text sequence for the first video dataset to produce a first constraint set;
    creating a verb-noun action pair logical constraint for each video-text action sequence pair in the first video dataset by reference to the ground truth text sequence for the first video dataset to produce a second constraint set;
    deriving a first objective function representing counterfactual-based plausible action sequence learning loss based on the first constraint set and the second constraint set;
    training the LVLM to optimize for the first objective function, thereby aligning a visual modality of the LVLM closer to a temporally correct, plausible action sequence;
    deriving a second objective function representing long-horizon action repetition loss based on an application of a larger penalty to actions that occur increasingly often in the ground truth text sequence over time in the first video dataset and a smaller penalty to actions that occur less often over time;
    receiving, at the trained LVLM, a second video dataset that depicts one or more actions; and
    generating, via the trained LVLM, a sequence of anticipated actions that could plausibly occur following the actions depicted in the second video dataset, each action in the sequence being temporally and spatially factual with respect to one another.

2. The method of claim 1, further comprising training the LVLM to optimize for the second objective function, thereby promoting a greater diversity in actions identified by the LVLM when generating plausible action sequences.

3. The method of claim 1, further comprising:
    receiving, at the LVLM, the first video dataset; and
    extracting video-frame level representations from the first video dataset via a frozen video encoder.

4. The method of claim 3, further comprising passing each frame of the extracted video-frame level representations through a Querying Transformer to obtain a set of Q-former features.

5. The method of claim 4, further comprising:
    applying a frame position embedding layer and a clip-position embedding layer to each feature of the Q-former features to produce an embedded feature set; and
    aggregating spatio-temporal information of the first video clip by passing the embedded feature set through a video-based Querying Transformer to produce a set of video embeddings describing one or more visual prompts.

6. The method of claim 1, wherein the augmented LVLM is implemented in an onboard computing device for an autonomous vehicle, and predictions generated by the augmented LVLM cause changes in operation of the autonomous vehicle.

7. A non-transitory computer-readable medium storing software for augmenting a large video language model (LVLM) for anticipating plausible action sequences, the software comprising instructions executable by one or more computers which, upon such execution, cause the one or more computers to:
    create a temporal logical constraint for each video-text action sequence pair in a first video dataset by reference to a ground truth text sequence for the first video dataset to produce a first constraint set;
    create a verb-noun action pair logical constraint for each video-text action sequence pair in the first video dataset by reference to the ground truth text sequence for the first video dataset to produce a second constraint set;
    derive a first objective function representing counterfactual-based plausible action sequence learning loss based on the first constraint set and the second constraint set;
    derive a second objective function representing long-horizon action repetition loss based on an application of a larger penalty to actions that occur increasingly often in the ground truth text sequence over time in the first video dataset and a smaller penalty to actions that occur less often over time;
    train the LVLM to optimize for the first objective function, thereby aligning a visual modality of the LVLM closer to a temporally correct, plausible action sequence;
    receive, at the trained LVLM, a second video dataset that depicts one or more actions; and
    generate, via the trained LVLM, a sequence of anticipated actions that could plausibly occur following the actions depicted in the second video dataset, each action in the sequence being temporally and spatially factual with respect to one another.

8. The non-transitory computer-readable medium storing software of claim 7, wherein the augmented LVLM is implemented in an onboard computing device for an autonomous vehicle, and predictions generated by the augmented LVLM cause changes in operation of the autonomous vehicle.

9. The non-transitory computer-readable medium storing software of claim 7, wherein the instructions further cause the one or more computers to train the LVLM to optimize for the second objective function, thereby promoting a greater diversity in actions identified by the LVLM when generating plausible action sequences.

10. The non-transitory computer-readable medium storing software of claim 7, wherein the instructions further cause the one or more computers to:
    receive, at the LVLM, the first video dataset; and
    extract video-frame level representations from the first video dataset via a frozen video encoder.

11. The non-transitory computer-readable medium storing software of claim 10, wherein the instructions further cause the one or more computers to pass each frame of the extracted video-frame level representations through a Querying Transformer to obtain a set of Q-former features.

12. The non-transitory computer-readable medium storing software of claim 11, wherein the instructions further cause the one or more computers to apply a frame position embedding layer and a clip-position embedding layer to each feature of the Q-former features to produce an embedded feature set.

13. The non-transitory computer-readable medium storing software of claim 12, wherein the instructions further cause the one or more computers to aggregate spatio-temporal information of the first video clip by passing the embedded feature set through a video-based Querying Transformer to produce a set of video embeddings describing one or more visual prompts.

14. A system for augmenting a large video language model (LVLM) for anticipating plausible action sequences, the system comprising one or more computers and one or more storage devices storing instructions that are operable, when executed by the one or more computers, to cause the one or more computers to:
    create a temporal logical constraint for each video-text action sequence pair in a first video dataset by reference to a ground truth text sequence for the first video dataset to produce a first constraint set;
    create a verb-noun action pair logical constraint for each video-text action sequence pair in the first video dataset by reference to the ground truth text sequence for the first video dataset to produce a second constraint set;
    derive a first objective function representing counterfactual-based plausible action sequence learning loss based on the first constraint set and the second constraint set;
    derive a second objective function representing long-horizon action repetition loss based on an application of a larger penalty to actions that occur increasingly often in the ground truth text sequence over time in the first video dataset and a smaller penalty to actions that occur less often over time;
    train the LVLM to optimize for the first objective function, thereby aligning a visual modality of the LVLM closer to a temporally correct, plausible action sequence;
    receive, at the trained LVLM, a second video dataset that depicts one or more actions; and
    generate, via the trained LVLM, a sequence of anticipated actions that could plausibly occur following the actions depicted in the second video dataset, each action in the sequence being temporally and spatially factual with respect to one another.

15. The system of claim 14, wherein the augmented LVLM is implemented in an onboard computing device for an autonomous vehicle, and predictions generated by the augmented LVLM cause changes in operation of the autonomous vehicle.

16. The system of claim 14, wherein the instructions further cause the one or more computers to train the LVLM to optimize for the second objective function, thereby promoting a greater diversity in actions identified by the LVLM when generating plausible action sequences.

17. The system of claim 14, wherein the instructions further cause the one or more computers to:
    receive, at the LVLM, the first video dataset; and
    extract video-frame level representations from the first video dataset via a frozen video encoder.

18. The system of claim 17, wherein the instructions further cause the one or more computers to pass each frame of the extracted video-frame level representations through a Querying Transformer to obtain a set of Q-former features.

19. The system of claim 18, wherein the instructions further cause the one or more computers to apply a frame position embedding layer and a clip-position embedding layer to each feature of the Q-former features to produce an embedded feature set.

20. The system of claim 19, wherein the instructions further cause the one or more computers to aggregate spatio-temporal information of the first video clip by passing the embedded feature set through a video-based Querying Transformer to produce a set of video embeddings describing one or more visual prompts.

* * * * *